UNITED STATES PATENT OFFICE.

AUGUST VOELKER, OF BEUEL, NEAR BONN, GERMANY.

METHOD OF MAKING TRANSPARENT QUARTZ GLASS.

1,051,035.        Specification of Letters Patent.        Patented Jan. 21, 1913.

No Drawing.        Application filed February 18, 1911. Serial No. 609,465.

*To all whom it may concern:*

Be it known that I, AUGUST VOELKER, a subject of the King of Prussia, German Emperor, residing at 77ᵃ Siegburgerstrasse, Beuel, near Bonn, in the Empire of Germany, have invented a new and useful Method of Making Transparent Quartz Glass, of which the following is a specification.

My invention relates to a method for making transparent quartz glass and has for its object utilization of arenaceous or ground quartz for this purpose.

The method consists in a non-transparent tube being primarily made of arenaceous or ground quartz in known manner in an electric resistance furnace, whereupon said quartz tube is remolten and simultaneously drawn out in an electric furnace and finally again molten in an oxyhydrogen flame or an electric arc and blown in known manner to molded articles.

The triple melting of the quartz material according to the present method is the reason, that finally articles of a transparent substance are obtained instead of the non-transparent or only translucent articles which are otherwise obtained from arenaceous or ground quartz.

As the principal part of the energy required is employed in form of electric energy in the electric furnace the present method has proven to be particularly economic compared with those methods which depended chiefly on the action of an oxyhydrogen flame.

Owing to the low costs with which transparent quartz articles may be made according to the present method, the latter renders it possible to manufacture all kinds of chemical utensils, water gages and also lamp glasses with advantage of quartz material, what was hitherto unadvisable owing to the high price of transparent quartz and the fact that non-transparent or only translucent quartz material was useless for the said purposes.

In carrying out the present method one preferably will proceed in the following manner: First a non-transparent quartz cylinder is made in known manner in an electric resistance furnace by embedding a heating rod in the space of said furnace, through which rod the electric current passes, in sand or ground quartz. The quartz charge in the furnace will then fuse around the rod and form a cylinder which may be blown out by introducing a gasifying substance and thereby forced into a mold. The thus obtained white, non-transparent cylinder is then passed through a second electric tubular furnace which has a muffle made of carbon and open in front and behind, in which muffle so high a temperature is produced by electric means that the non-transparent quartz tube will on being drawn through this furnace be re-molten. The quartz tube thus re-molten in the carbon tube is slowly drawn out to a thinner tube which is subsequently again remolten a third time in an oxyhydrogen flame or an electric arc and blown in the manner known in the glass blowers' art to receivers, crucibles and the like. The second fusion in the electric tubular furnace together with the simultaneous drawing out of the tube has the result, that the previously non-transparent tube will become to a certain degree translucent so that the subsequent final fusion in the oxyhydrogen flame or the electric arc will be able to produce a fully transparent material.

I desire it to be expressly understood, that I do not bind myself to the manner of carrying out the method as described above, but reserve to myself the right of varying or modifying it. For example the non-transparent quartz cylinder produced in the electric resistance furnace may not be first blown out in a mold by introducing a gasifying substance, but it may be drawn out to a smaller diameter during the passage through the carbon muffle of the second electric furnace, that is during the second fusion. The carbon muffle has necessarily an inner diameter sufficiently larger than the outer diameter of the quartz tube to permit an easy passage of the latter. The quartz tube remolten during the passage through the carbon muffle and thereby having become to a certain degree translucent may be further drawn out to a thinner diameter or it may be finished during the passage through the oxyhydrogen flame or electric arc, that is during the third fusion which renders the quartz transparent.

I claim:

1. The herein described method of making transparent quartz articles, which consists in electrically forming a non-transparent quartz tube from arenaceous quartz, ground quartz and the like, remelting and drawing out the quartz tube so as to form a thinner tube, which is more or less translucent, and melting the translucent tube for a third time while finishing the article, whereby the quartz is rendered transparent.

2. The herein described method of making transparent quartz articles, which consists in electrically forming a non-transparent quartz tube from arenaceous quartz, ground quartz and the like and immediately blowing out the quartz tube to form a hollow body, remelting and drawing out the quartz hollow body, whereby the quartz is rendered more or less translucent, and melting the translucent drawn out body for a third time while finishing the article, whereby the quartz is rendered transparent.

3. The herein described method of making transparent quartz articles, which consists in electrically forming a non-transparent quartz tube from arenaceous quartz, ground quartz and the like, electrically remelting and drawing out the quartz tube so as to form a thinner tube, which is more or less translucent, and melting the translucent tube for a third time in a source of intense heat while finishing the article, whereby the quartz is rendered transparent.

4. The herein described method of making transparent quartz articles, which consists in electrically forming a non-transparent quartz tube from arenaceous quartz, ground quartz and the like and immediately blowing out the quartz tube to form a hollow body, electrically remelting and drawing out the quartz hollow body, whereby the quartz is rendered more or less translucent, and melting the translucent drawn out body for a third time in a source of intense heat while finishing the article, whereby the quartz is rendered transparent.

5. The herein described method of making transparent quartz articles, which consists in electrically forming a non-transparent quartz body from arenaceous quartz, ground quartz and the like, electrically remelting and drawing out the quartz tube so as to form a thinner tube, which is more or less translucent, and melting the translucent tube for a third time in an oxyhydrogen flame while finishing the article, whereby the quartz is rendered transparent.

6. The herein described method of making transparent quartz articles, which consists in electrically forming a non-transparent quartz tube from arenaceous quartz, ground quartz and the like and immediately blowing out the quartz tube to form a hollow body, electrically remelting and drawing out the quartz hollow body, whereby the quartz is rendered more or less translucent, and melting the translucent drawn out body for a third time in an oxyhydrogen flame while finishing the article, whereby the quartz is rendered transparent.

In testimony whereof I hereto affix my signature in the presence of two witnesses.

AUGUST VOELKER.

In presence of—
   NIKOLAUS MEURER,
   LOUIS VANDORY.